UNITED STATES PATENT OFFICE.

KARL STEPHAN, OF CHARLOTTENBURG, GERMANY, ASSIGNOR TO CHEMISCHE FABRIK AUF ACTIEN (VORM. E. SCHERING), OF BERLIN, GERMANY.

PRODUCTION OF ISOPRENE.

1,057,680.  Specification of Letters Patent.  Patented Apr. 1, 1913.

No Drawing. Application filed January 24, 1912. Serial No. 673,096.

*To all whom it may concern:*

Be it known that I, KARL STEPHAN, doctor of philosophy, chemist, citizen of the German Empire, residing at Charlottenburg, German Empire, have invented a new and useful Improvement in the Production of Isoprene, of which the following is a specification.

According to this invention isoprene is produced by heating nopinene which substance is also known as B-pinene. This body, the boiling point of which is 165° to 166° centigrade, has not heretofore been employed for making isoprene, and it is found that by its use it is possible to obtain isoprene in considerably larger quantities than when, for example, pinene is employed. This result is remarkable, as on account of the great difference in the behavior of the various terpene hydrocarbons it was by no means to be expected that it would be possible to obtain isoprene from nopinene.

*Examples.*

1. Nopinene is caused to pass through an iron tube heated to from about 500° to 520° centigrade and connected to a cooled condenser. In addition to other products having a higher boiling point, isoprene collects, this can easily be obtained in a pure condition by fractional distillation. The amount of isoprene obtained the boiling point of which lies between 32° and 40°, is about one tenth of the weight of the nopinene.

2. Nopinene in the form of vapor is caused to pass slowly over electrically heated wire gauze. The vapors are condensed and the resulting products are treated as in the first example. The amount of isoprene obtained is about one fifth of the weight of the nopinene.

I claim as my invention:—

1. The process of producing isoprene which consists in heating nopinene to a temperature which is sufficiently higher than the boiling point of nopinene to cause the decomposition of the latter substance into isoprene and other compounds, condensing the vapors and isolating the isoprene so formed.

2. The process of producing isoprene which consists in heating nopinene to a temperature of about 500° centigrade, condensing the vapors and isolating the isoprene so formed.

3. The process of producing isoprene which consists in passing nopinene in contact with metal heated to a temperature which raises the temperature of the nopinene to about 500° centigrade, condensing the vapors, and isolating the isoprene by fractional distillation.

In testimony whereof I have hereunto set my signature in the presence of two subscribing witnesses.

KARL STEPHAN.

Witnesses:
 WOLDEMAR HAUPT,
 HENRY HASPER.